United States Patent
Tanaka

(10) Patent No.: US 8,439,146 B2
(45) Date of Patent: May 14, 2013

(54) CANISTER DEVICE FOR MOTORCYCLE

(75) Inventor: Koichi Tanaka, Shizuoka-Ken (JP)

(73) Assignee: Suzuki Motor Corporation, Hamamatsu-Shi (JP)

( * ) Notice: Subject to any disclaimer, the term of this patent is extended or adjusted under 35 U.S.C. 154(b) by 56 days.

(21) Appl. No.: 13/162,698

(22) Filed: Jun. 17, 2011

(65) Prior Publication Data
US 2011/0308874 A1    Dec. 22, 2011

(30) Foreign Application Priority Data
Jun. 17, 2010   (JP) .................................. 2010-138528

(51) Int. Cl.
*B62D 61/02*   (2006.01)
(52) U.S. Cl.
USPC ........... 180/219; 180/68.1; 280/833; 280/835
(58) Field of Classification Search .................. 180/219, 180/68.1; 280/833, 835
See application file for complete search history.

(56) References Cited

U.S. PATENT DOCUMENTS

| | | | |
|---|---|---|---|
| 8,118,128 B2* | 2/2012 | Shimura et al. ............... | 180/219 |
| 8,141,672 B2* | 3/2012 | Kuramochi et al. ......... | 180/69.4 |
| 8,256,557 B2* | 9/2012 | Suzuki .......................... | 180/219 |
| 2010/0206653 A1* | 8/2010 | Koike ........................... | 180/225 |
| 2010/0243358 A1* | 9/2010 | Suzuki .......................... | 180/219 |
| 2011/0120796 A1* | 5/2011 | Kuramochi et al. .......... | 180/219 |
| 2011/0127098 A1* | 6/2011 | Tsutsui et al. ................ | 180/219 |

FOREIGN PATENT DOCUMENTS
JP           8142959 A      6/1996

* cited by examiner

*Primary Examiner* — Tashiana Adams
*Assistant Examiner* — Marlon Arce
(74) *Attorney, Agent, or Firm* — Barnes & Thornburg LLP

(57) ABSTRACT

A motorcycle includes a pair of left and right main frames, a fuel tank placed on an upper side of the main frames, an engine suspended on a lower side of the main frames and provided with a cylinder assembly and a crankcase, and a canister that adsorbs an evaporated fuel gas generated in the fuel tank, wherein the canister is arranged inside the main frames in a plan view of the motorcycle and is disposed on a rear side of the cylinder assembly and on an upper side of the crankcase of the engine in a side view of the motorcycle.

6 Claims, 10 Drawing Sheets

CANISTER DEVICE FOR MOTORCYCLE

PRIORITY CLAIM

This patent application claims priority to Japanese Patent Application No. 2010-138528, filed Jun. 17, 2010, the disclosure of which is incorporated herein by reference in its entirety.

BACKGROUND

1. Field of the Invention

Disclosed embodiments relate to a canister device for a motorcycle which is provided with a canister which adsorbs an evaporated fuel gas in a fuel tank and feeds the evaporated fuel gas to the engine, and also relates to a motorcycle provided with such canister.

2. Related Art

Conventionally, it is known that in a fuel tank of a motorcycle, accumulated fuel is vaporized and retained in an upper portion of the fuel tank as an evaporated fuel gas, and leakage of the evaporated fuel gas into the air during an engine operation stop time may result in wasteful use of the fuel and adverse influence to environment.

In order to solve such adverse matters, Patent Document 1 (Japanese Patent Laid-Open Publication No. 8-142959) discloses an apparatus in which a canister is arranged on a seat rail of a motorcycle, an evaporated fuel gas in a fuel tank is introduced into the canister and adsorbed by activated carbon or the like in the canister, and then the evaporated fuel gas in the canister is sucked into a carburetor at an engine operation start time.

However, in the apparatus described in Patent Document 1, since the canister is arranged on the seat rail, the canister is mounted in a position apart from the center of gravity of a vehicle, resulting in reduction of kinetic performance of the vehicle. The kinetic performance of the vehicle refers to, for example, a speed of inclination when the vehicle is inclined to left or right by a driver's centroid movement to turn the vehicle, or a speed of return from the inclined state.

SUMMARY

Disclosed embodiments were conceived in consideration of the circumstances encountered in the prior art mentioned above. Disclosed embodiments provide a canister device for a motorcycle that can improve kinetic performance of the motorcycle.

Disclosed embodiments also provide a canister device for a motorcycle that can consume an evaporated fuel gas adsorbed by a canister at an early stage of start of an engine for achieving a stable engine operation thereafter.

Disclosed embodiments also provide a motorcycle provided with a canister improved in a layout or arrangement thereof.

According to disclosed embodiments, these featurescan be achieved by providing, in one aspect, a canister device for a motorcycle which includes a main frame, a fuel tank placed on an upper side of the main frame, an engine suspended on a lower side of the main frame and provided with a cylinder assembly and a crankcase, and a canister that adsorbs an evaporated fuel gas generated in the fuel tank, wherein the canister is arranged inside the main frame on a rear side of the cylinder assembly and on an upper side of the crankcase of the engine in a standing state of the motorcycle.

In another aspect of the disclosed embodiments, the canister may be disposed in the engine room.

According to at least one disclosed embodiment, the canister is arranged on the rear side of the cylinder assembly of the engine and on the upper side of the crankcase of the engine. Therefore, the canister can be arranged near the center of gravity of a vehicle, thereby improving the kinetic performance of the vehicle. Moreover, the canister is arranged inside the main frame, thereby preventing a direct impact from being applied to the canister when the vehicle rolls over.

According to at least one disclosed embodiment, the canister is arranged in the engine room, and the heat from the engine is hence applied to the canister at the engine operation start period, thereby reducing a volume of the evaporated fuel gas adsorbed by the canister, and allowing an excess evaporated fuel gas to be fed into an intake pipe at an early stage of the engine start. Thus, the evaporated fuel gas adsorbed by the canister can be consumed at an early stage of start of the engine, thereby achieving a stable engine operation.

A motorcycle provided with such specific canister device can also attain an improved operational advantageous effect.

The nature and further characteristic features will be made clearer from the following descriptions made with reference to the accompanying drawings.

BRIEF DESCRIPTION OF THE DRAWINGS

In the accompanying drawings:

FIG. 4 is a left side view showing the engine in FIG. 2 together with the canister and the like;

DESCRIPTION OF THE DISCLOSED EMBODIMENTS

Hereunder, a best mode for carrying out the disclosed embodiments will be described with reference to the drawings. Further, it is to be noted that the present invention is not limited to the embodiment and also noted that terms such as "upper", "lower", "right", "left" and the like terms indicating positions or directions are used herein with reference to the illustrations of the drawings or an actual state of a driver riding on a vehicle.

Figure 1:
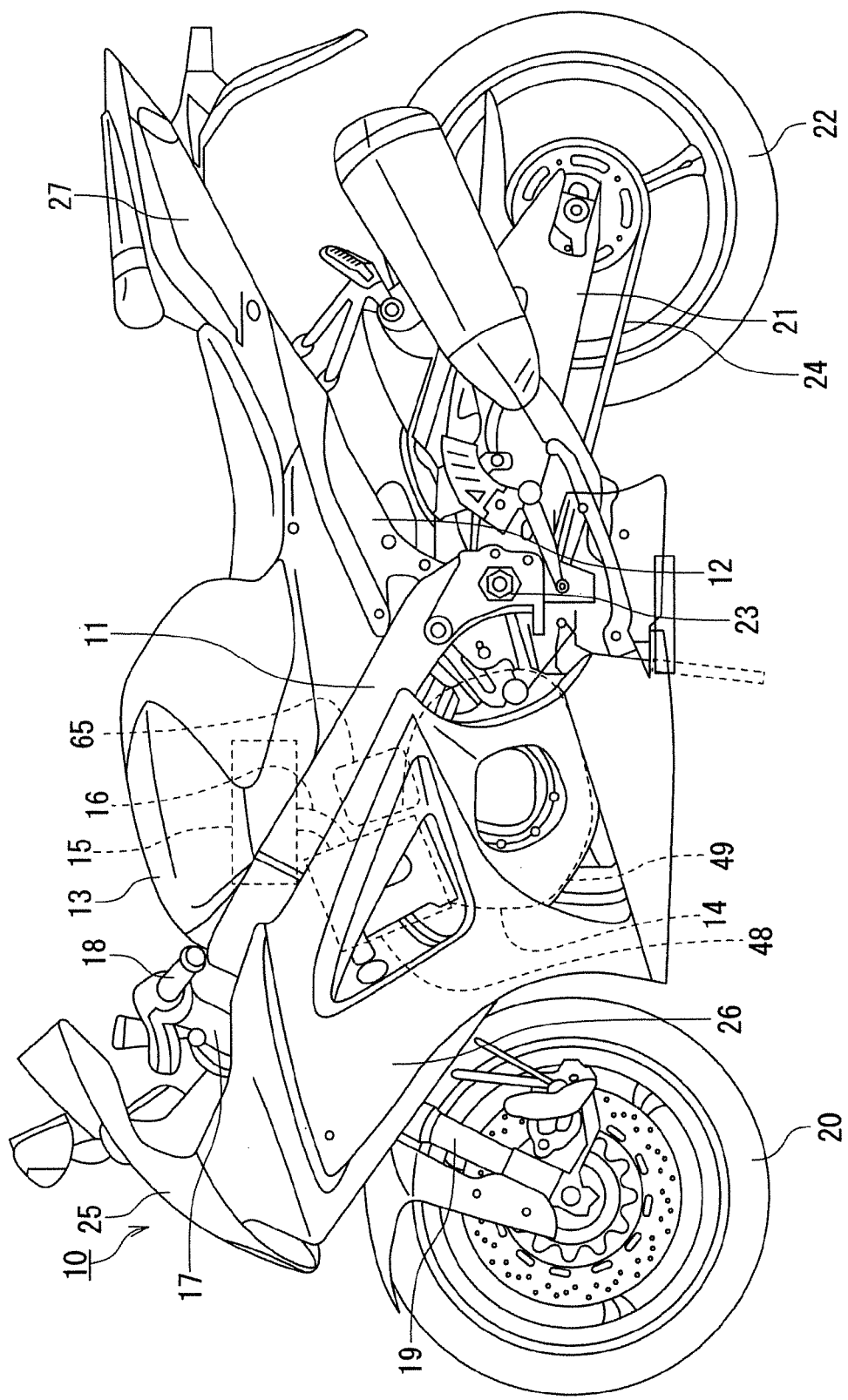
FIG. 1 is a left side view showing a motorcycle to which an embodiment of a canister device for a motorcycle according to the disclosed embodiments is applied.

For example, with reference to FIG. 1, a motorcycle 10 is provided with a canister device according to this embodiment. The motorcycle 10 is so-called sport-type motorcycle with an entire vehicle covered with an exterior component. The motorcycle 10 includes a long main frame 11 arranged in a front/rear (longitudinal) direction substantially at an intermediate portion of the vehicle (motorcycle), and a seat rail 12 extending rearward and upward from a rear portion of the main frame 11 constitute a vehicle body frame.

The motorcycle 10 also includes a fuel tank 13 arranged on an upper side of the main frame 11, and an engine 14 arranged on a lower side of the main frame 11. An air cleaner 15 is arranged on an upper side of the engine 14 and on a lower side of the fuel tank 13, inside the main frame 11, so as to introduce clean outside air into the engine 14. An intake pipe 16 is provided between the air cleaner 15 and the engine 14.

The intake pipe 16 includes a fuel injection device (i.e., injector) and an air intake amount regulating (adjusting) device (i.e., throttle body) used in, for example, a fuel injection system which is a known technique, or a fuel supply device such as a carburetor. With this configuration, fuel in the fuel tank 13 is, for example, supplied to the fuel injection device and injected into the intake pipe 16. The injected fuel is mixed with air supplied from the air cleaner 15 and supplied to the engine 14.

On a front portion of the main frame 11, a steering shaft, not shown, rotatably supported by a head pipe 17 (described later), a handlebar 18 placed in an upper portion of the steering shaft, and a pair of left and right front forks 19 arranged on the steering shaft, are pivoted rotatably in a lateral direction, and a front wheel 20 is rotatably suspended at a lower portion of the front fork 19.

On the rear side of the main frame 11, a swing arm 21 connected to a rear portion of the main frame 11, and a rear wheel 22 suspended at a rear portion of the swing arm 21 are also provided. The swing arm 21 is vertically swingably connected to a swing shaft 23 provided in the rear portion of the main frame 11 in parallel with a vehicle width direction. The rear wheel 22 is rotationally driven by a drive chain 24 stretched around the rear wheel 22 and a rear portion of the engine 14.

As described above, the external components covering the entire vehicle structure includes a front cover 25 that covers a front portion of the vehicle, a side cover 26 that is connected to a lower portion of the front cover 25 and covers a side portion of the vehicle, and a rear cover 27 that covers the seat rail 12.

Figure 2:
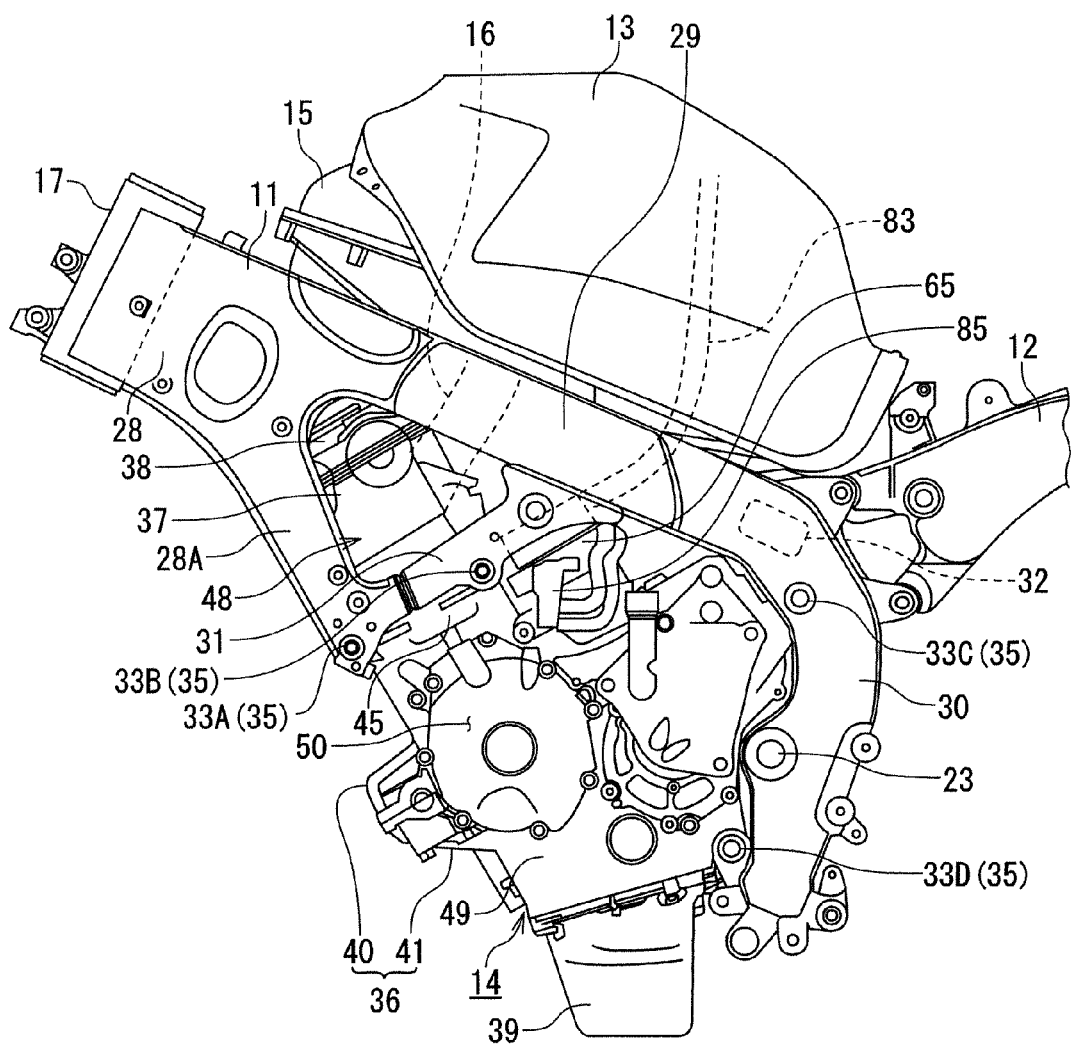
FIG. 2 is a left side view showing a main frame, an engine, a fuel tank, a canister and the like in the motorcycle in FIG. 1.
Figure 3:
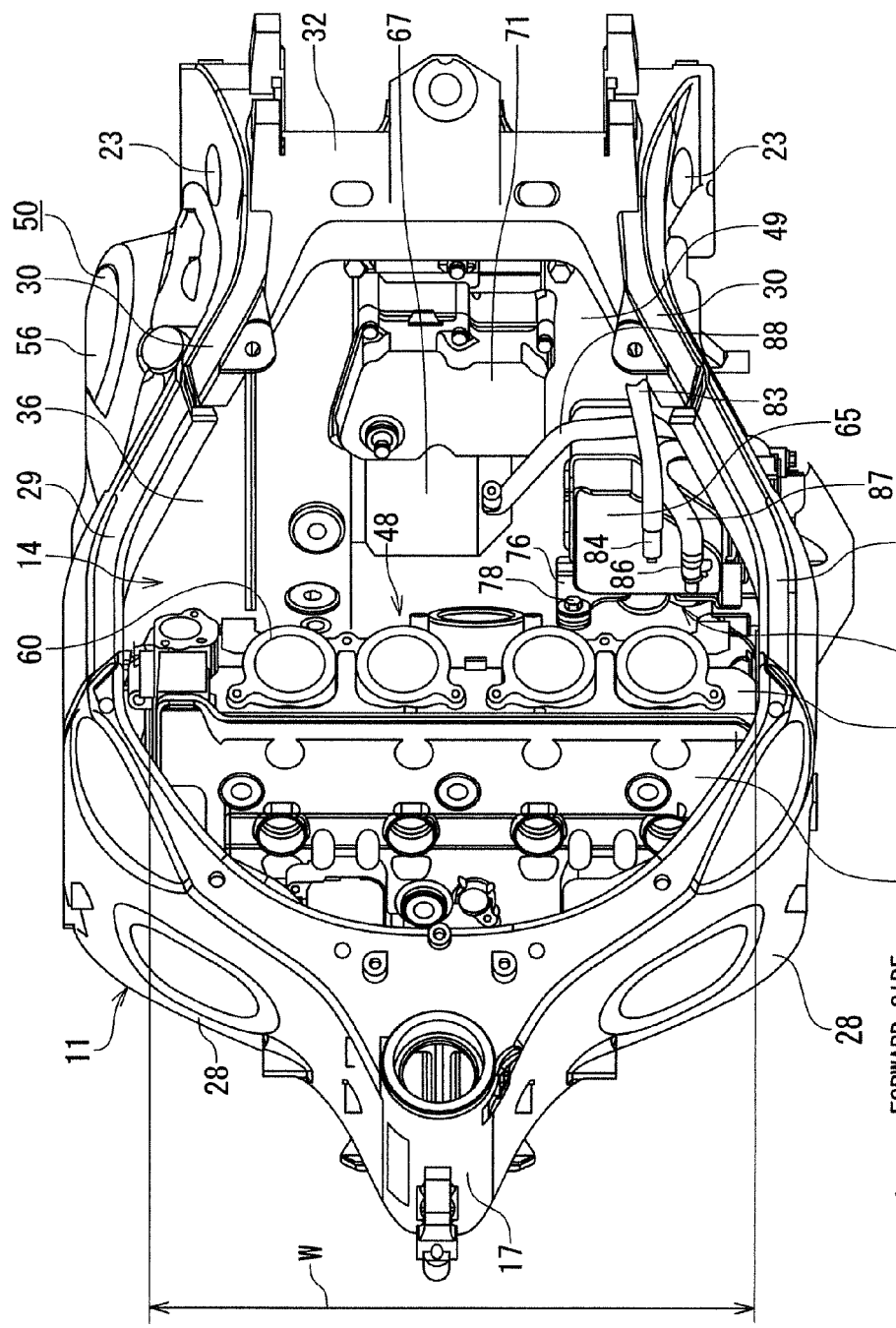
FIG. 3 is a plan view showing the main frame, the engine, the canister and the like in FIG. 2.

As shown in FIGS. 2 and 3, the main frame 11 includes a top frame 28 arranged on a front side, a pair of left and right side frames 29 connected to rear portions of the top frame 28, and end frames 30 connected to rear portions of the side frame 29.

The tubular head pipe 17 having a through hole in a vertical direction is integrally formed with the front portion of the top frame 28, and a steering shaft is rotatably supported by the head pipe 17 as described above. The top frame 28 includes a pair of left and right extending portions 28A extending rearward and downward from immediately behind the head pipe 17. Further, a sub-frame 31 is provided across rear ends of the downwardly extending portions 28A and a lower surface of the side frame 29.

The end frame 30 is connected to a rear end of the side frame 29 and then curved rearward and downward from the connected portion. A center bridge 32 parallel with the vehicle width direction is integrally formed with an upper portion of the end frame 30 to increase rigidity of the main frame 11. Further, the center bridge 32 is formed in the end frame 30, and thus the main frame 11 is formed so as to provide substantially a circular shape on plan view in FIG. 3, and the fuel tank 13 is mounted so as to block substantially the circular main frame 11.

Hereunder, with reference to FIG. 2, a suspension structure of the engine 14 suspended on a lower side of the main frame 11 will be described.

Figure 4:
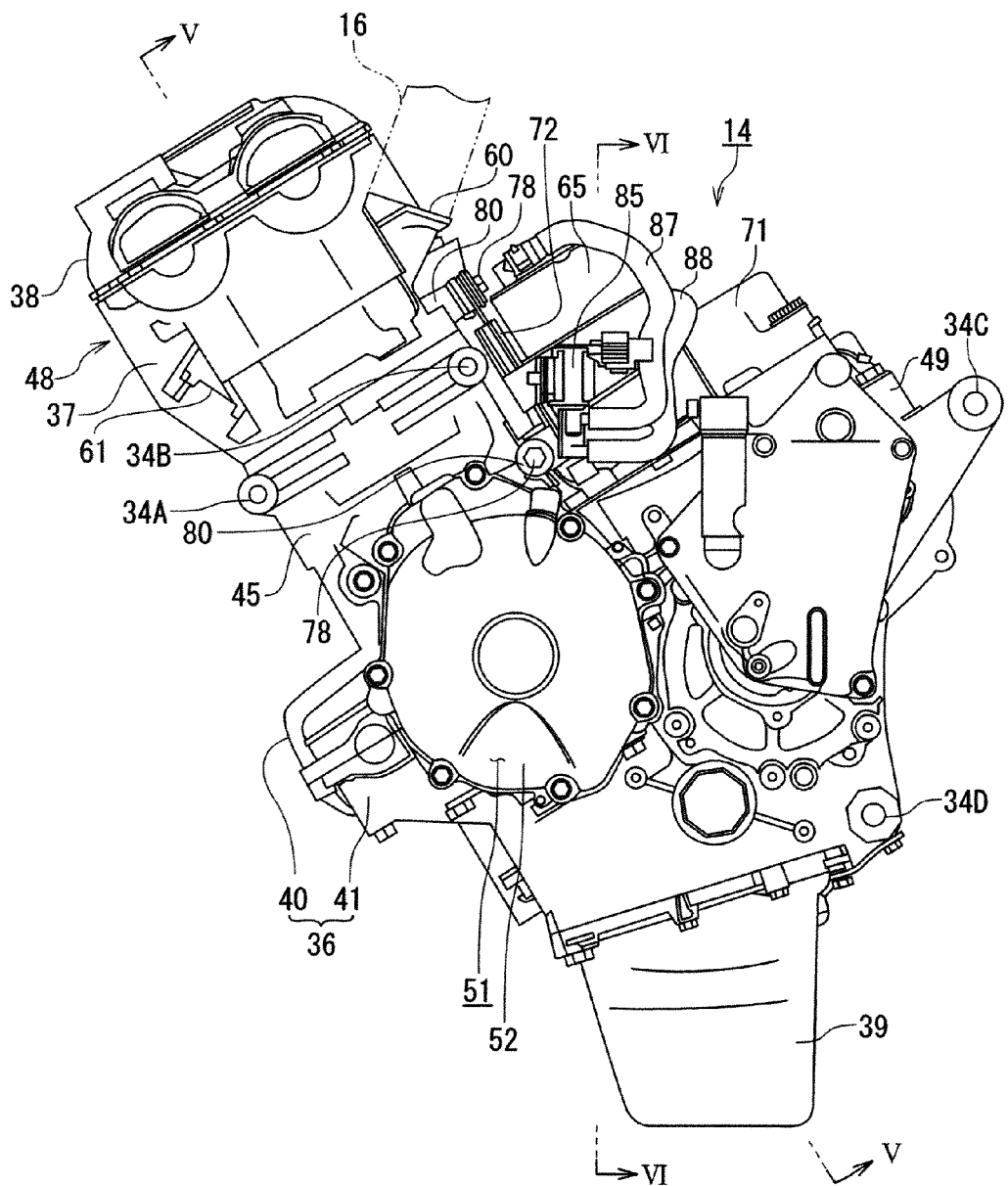
Figure 7:
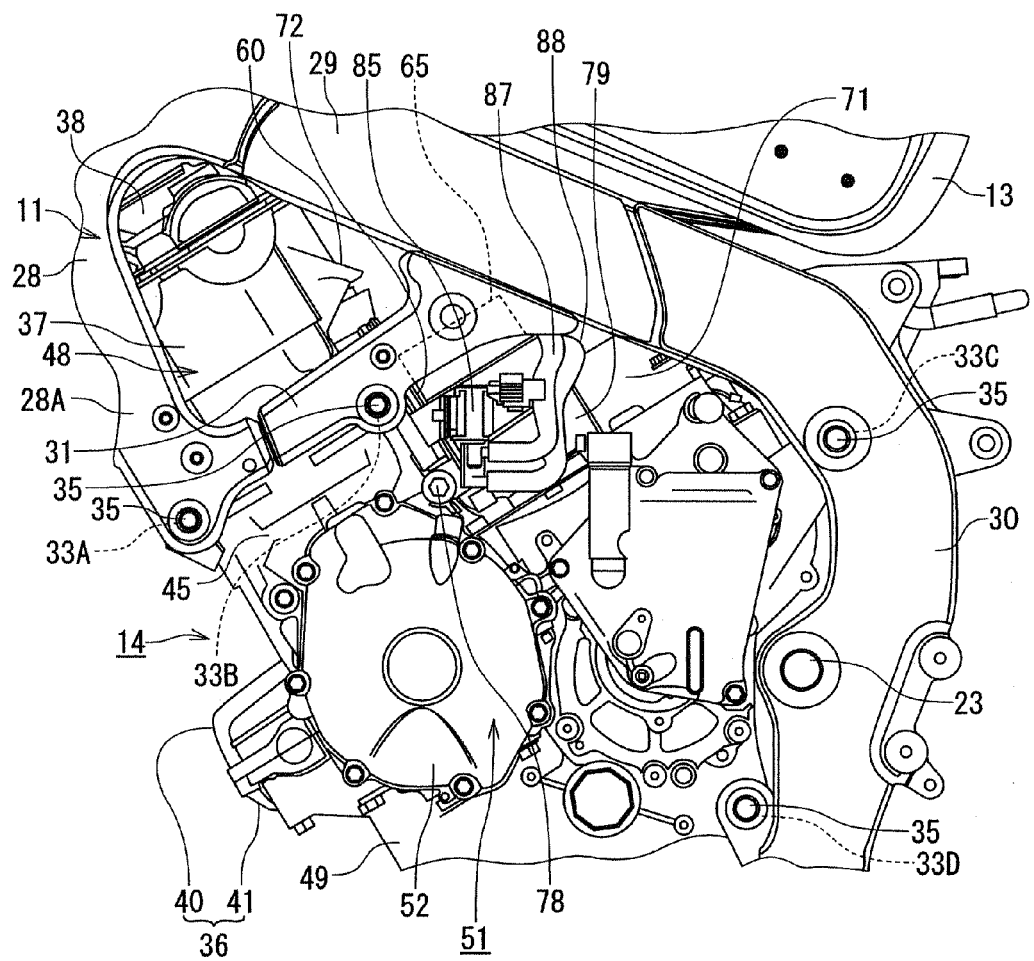
FIG. 7 is a partially enlarged left side view of FIG. 2.

As shown in FIGS. 2, 4 and 7, a bolt hole 33A for suspension (suspension bolt hole) 33A provided in a protruding portion of the top frame 28 of the main frame 11, a bolt hole for suspension (suspension bolt hole) 33B provided in the sub frame 31, and through holes 34A and 34B provided in a cylinder assembly 48 (described later) in the engine 14 are fastened by through bolts 35 parallel with the vehicle width direction. A suspension bolt hole 33C and a suspension bolt hole 33D provided in an upper portion of the end frame 30 in the main frame 11, through holes 34C and 34D provided in a rear portion of a crankcase 49 (described later) of the engine 14 are fastened by similar through bolts 35, thus the engine 14 being firmly suspended from the main frame 11.

As an assembling procedure of the engine 14 in a manufacturing process, the engine 14 is conveyed from below the main frame 11, the through bolts 35 are inserted into the suspension bolt holes 33A to 33D in the main frame 11 and the through holes 34A to 34D in the engine 14, and the engine 14 is secured to the main frame 11 using the through bolt 35. The assembling procedure allows easy assembling of the engine 14 without interfering with other components, thereby reducing loads on an operator.

As described above, the engine 14 suspended from the main frame 11 includes, as shown in FIG. 4, an engine case 36 placed in a lower middle portion, a cylinder head 37 and a head cover 38 placed in order in a front upper portion of the engine case 36, and an oil pan 39 arranged to a lower portion of the engine case 36.

The engine case 36 includes an upper case section 40 and a lower case section 41 vertically joined to each other as the case 36. The upper case section 40 is formed as a crankcase upper half body having a lower portion that rotatably supports a crankshaft 42 (FIG. 5), and in a front upper portion of the crankcase upper half body, a so-called cylinder 45, in which a piston 44 (FIG. 5) is inserted to be reciprocally movable, is integrally formed with the crankcase upper half body so as to be inclined forward.

The lower case section 41 is formed as a crankcase lower half body that is joined to the crankcase upper half body of the upper case section 40 and rotatably supports the crankshaft 42, and the oil pan 39 is mounted to a lower portion of the lower case section 41.

Figure 5:
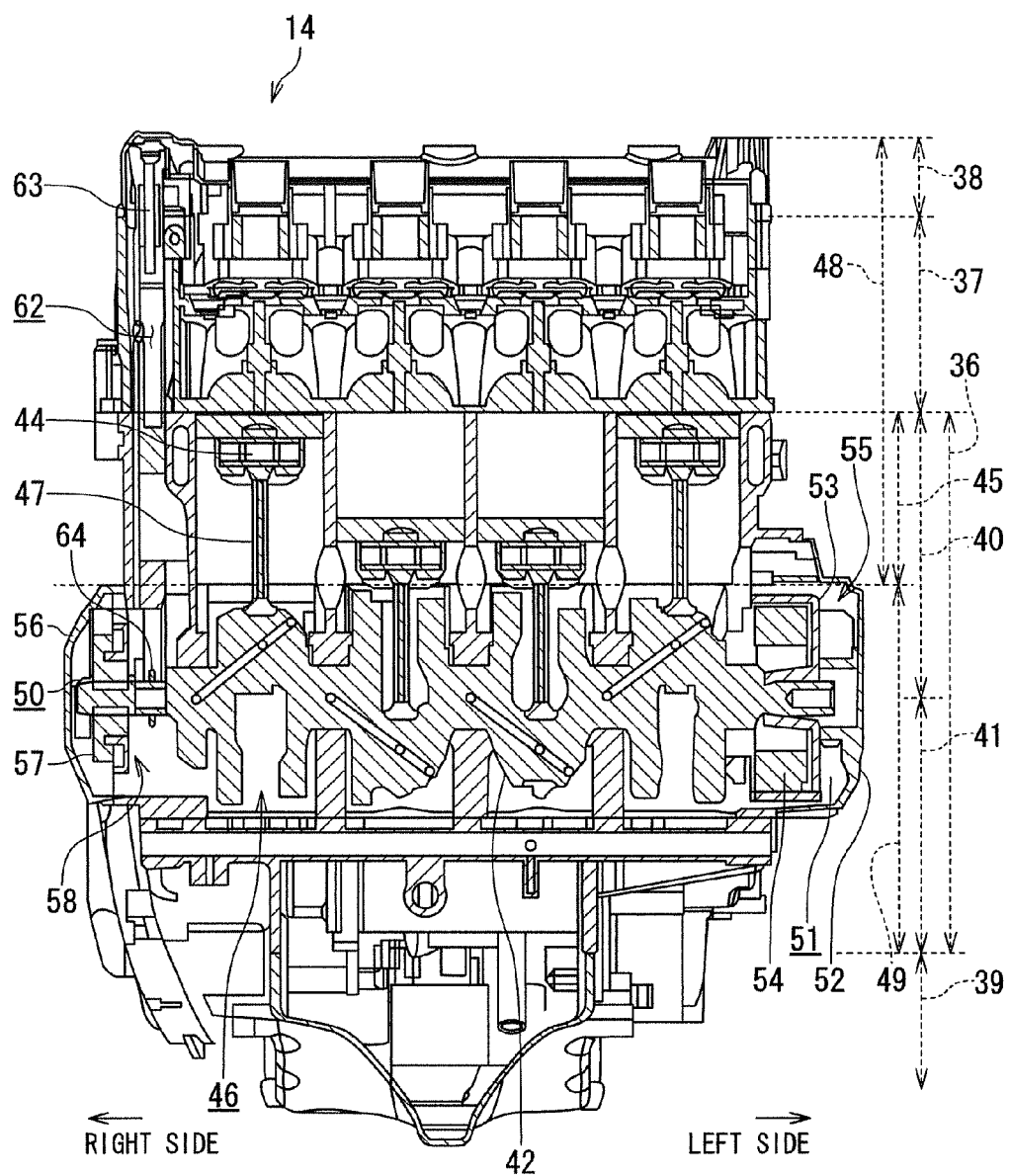
FIG. 5 is a sectional view taken along the line V-V in FIG. 4.
Figure 6:
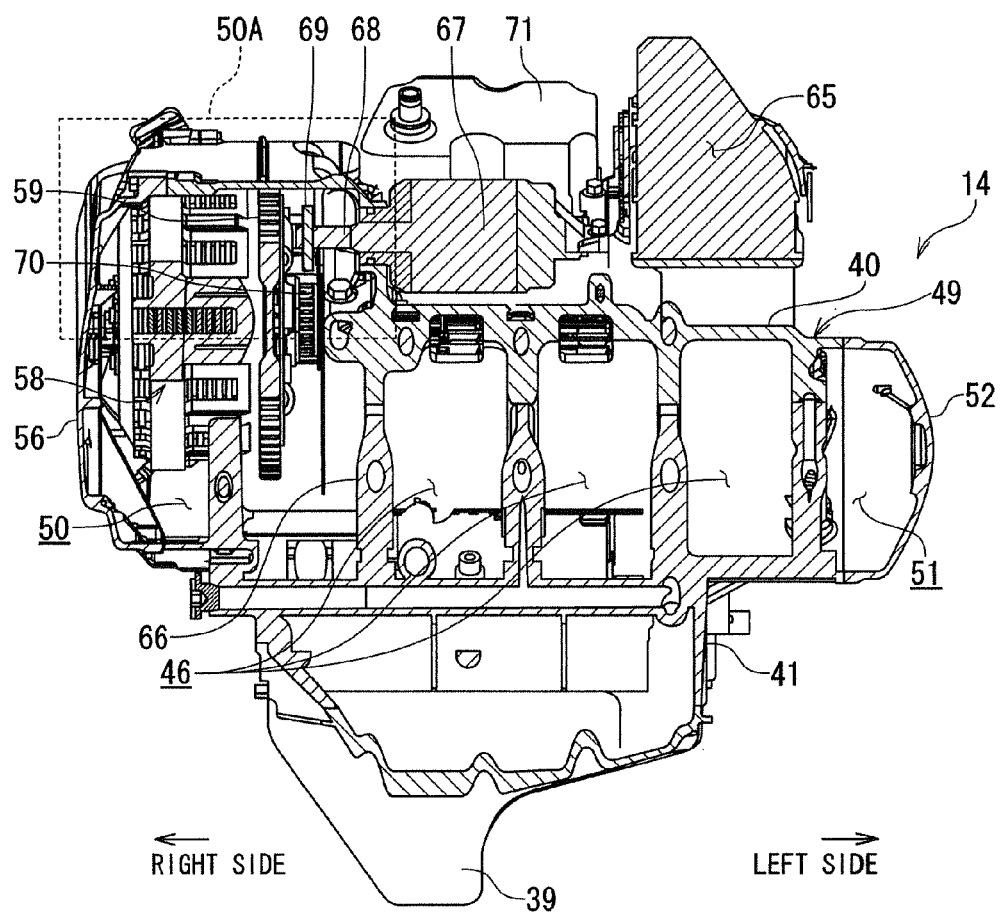
FIG. 6 is a sectional view taken along the line VI-VI in FIG. 4.

As shown in FIGS. 4, 5 and 6, in the engine 14, the upper case section 40 and the lower case section 41 are vertically connected, a crank chamber 46 is partitioned and formed in a front lower portion of the engine 14, and a transmission chamber, not shown, is formed on a rear side of the crank chamber 46. As described above, the crankshaft 42 substantially parallel with the vehicle width direction is rotatably supported by the crank chamber 46. The piston 44 is connected to the crankshaft 42 via a connecting rod 47, and the piston 44 is configured to be reciprocally movable in the cylinder 45.

Hereunder, for the sake of convenience of description, an engine part constituted by the head cover 38, the cylinder head 37 and the cylinder 45 is defined as a cylinder assembly 48, and an engine part below the cylinder 45 is defined as a crankcase 49.

The crankcase 49 includes, in the vehicle width direction, a clutch chamber 50 in one of the crank chambers 46 and a generator chamber 51 in the other one thereof In this embodiment, the crankcase 49 includes the generator chamber 51 on a left side and the clutch chamber 50 on a right side of the crank chamber 46.

The generator chamber 51 is partitioned and formed by the crankcase 49 (a lower portion of the upper case section 40 and the lower case section 41), and a generator cover 52 mounted to a left side surface of the crankcase 49. The generator chamber 51 houses a generator device 55 including a fly wheel 53 rotatably integrally connected to a left end of the crankshaft 42, and a coil magnet 54 secured to the crankcase 49 on an inside of the flywheel 53. The generator device 55 generates power by rotation of the crankshaft 42.

Meanwhile, the clutch chamber 50 is partitioned and formed by the crankcase 49 (the lower portion of the upper case section 40 and the lower case section 41), and a clutch cover 56 mounted to a right side surface of the crankcase 49. The clutch chamber 50 houses a primary gear 57 rotatably integrally connected to a right end of the crankshaft 42, and a clutch device 58 disposed on a rear side of the primary gear 57.

A ring gear 59 is formed on an outer peripheral end of the clutch device 58, and the ring gear 59 is arranged to directly engage the primary gear 57.

The transmission chamber housing a plurality of transmission gear trains is provided on a rear side of the clutch device 58 in the engine 14. The clutch device 58 is configured so that a driver selects an operation as a connection state or a disconnection state, and transmits the power, i.e., torque, from the crankshaft 42 to the transmission gear trains when being connected. The transmission gear trains convert the power transmitted from the clutch device 58 into an output having a predetermined rpm, and drive the rear wheel 22 via the drive chain 24 (FIG. 1).

As described above, as shown in FIGS. 4 and 5, the cylinder assembly 48 is configured so that the cylinder head 37 and the head cover 38 are provided in order on the cylinder 45 formed in an upper portion of the upper case section 40. One end of the intake pipe 16 (FIGS. 1 and 2) is connected to an intake port 60 of the cylinder head 37, and the other end of the intake pipe 16 is connected to the air cleaner 15.

An exhaust port 61 in the cylinder head 37 is connected to an exhaust pipe, not shown. Further, the cylinder head 37 and the head cover 38 include a so-called valve gear mechanism including a camshaft, a rocker arm, and a supply and exhaust valve, which are all not shown.

A cam chain tunnel 62 is partitioned and formed in a right portion of the head cover 38, the cylinder head 37, and the cylinder 45 connected to each other. The cam chain tunnel 62 communicates with the clutch chamber 50 disposed on a lower side thereof. A right end of a cam shaft protrudes into the cam chain tunnel 62, and a cam driven gear 63 is rotatably integrally secured to the protruding portion of the cam shaft. A cam chain, not shown, runs between the cam driven gear 63 and a cam drive gear 64 provided on the crankshaft 42, and the camshaft is configured to be rotatable in synchronization with the crankshaft 42.

Hereunder, with reference to FIGS. 3, 4, 6 to 9, a canister 65 having a structure, which adsorbs an evaporated fuel gas in the fuel tank 13 and feeds the evaporated fuel gas to the engine 14, will be described.

The canister 65 is a device which houses an adsorbent such as activated carbon, causes the adsorbent to adsorb the evaporated fuel gas in the fuel tank 13, and then, feeds the adsorbed evaporated fuel gas via the intake pipe 16 in the fuel supply device to the engine 14 at engine operation start period.

In this embodiment, as shown in FIGS. 3, 4 and 6, the canister 65 is arranged inside the main frame 11, and on the rear side of the cylinder assembly 48 of the engine 14 and on the upper side of the crankcase 49 and within a range of a width W of the cylinder assembly 48 in the engine 14 in the vehicle width direction. As also shown in FIGS. 1 and 2, the canister 65 is arranged on the lower side of the fuel tank 13 and the intake pipe 16.

Figure 8:
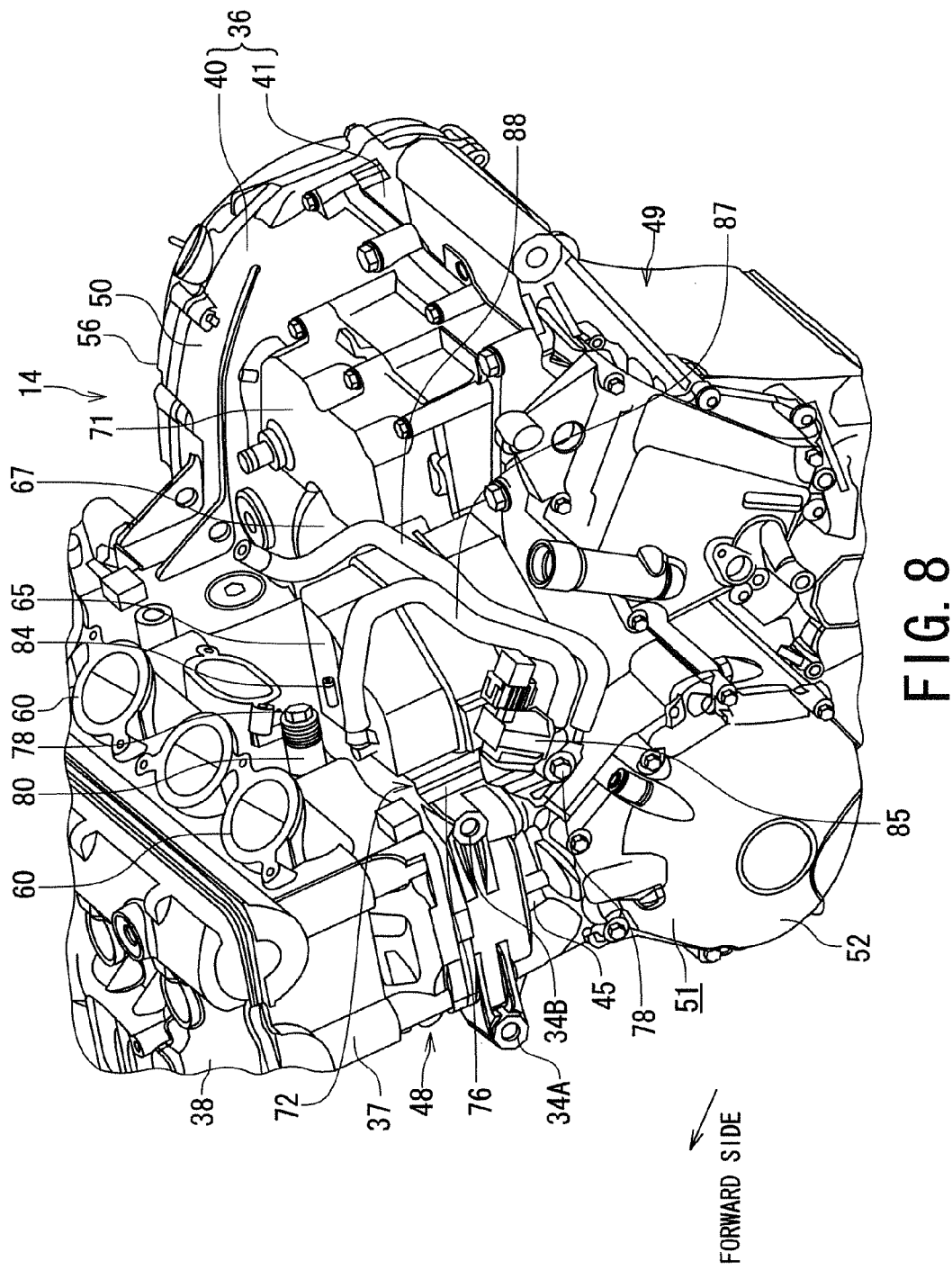
FIG. 8 is an obliquely rear perspective view showing the engine in FIG. 7 together with the canister.

With reference to FIGS. 6 and 8, in the engine 14, the clutch chamber 50 is formed at a level higher than the crank chamber 46 or the transmission chamber. Thus, the clutch cover 56 and a right side wall section 66 of the crankcase 49 (the lower portion of the upper case section 40 and the lower case section 41), that is, a wall section forming a left side of the clutch chamber 50, are formed so as to protrude higher than the crank chamber 46. A starter motor 67 is arranged on a left side of a protruding portion 50A of the clutch chamber 50.

The canister 65 is arranged on a left side of the starter motor 67 on the side opposite to the clutch chamber 50. Thus, the canister 65 is arranged in a position opposite to the clutch chamber 50 in the vehicle width direction, and the clutch chamber 50, the starter motor 67, and the canister 65 are arranged in the upper portion of the crankcase 49 in parallel with the vehicle width direction.

The starter motor 67 is arranged in the upper portion of the crankcase 49 and on the rear side of the cylinder assembly 48. In the starter motor 67, a driver generally presses a starter switch, not shown, disposed near the handlebar 18 (FIG. 1), and thus, a battery, not shown, supplies electric power to rotationally drive the output shaft 68. The output shaft 68 is arranged so as to protrude into the clutch chamber 50, and a starter drive gear 69 is rotatably integrally mounted to a front end portion of the output shaft 68. The starter drive gear 69 is arranged to be engaged with a starter driven gear 70 provided coaxially with the clutch device 50. According to this structure, the driver presses the starter switch to drive the starter motor 67 so as to transmit a driving force of the starter motor 67 via the clutch device 58 to the crankshaft 42 to thereby start the engine 14.

Further, in the upper portion of the crankcase 49, a breather chamber 71 is arranged together with the canister 65 on a rear side of the starter motor 67. The breather chamber 71 acts to separates oil mist stirred in the transmission chamber into gas and liquid and to introduces the oil mist into the transmission chamber and the gas into the air cleaner 15 (FIG. 1).

Figure 9:
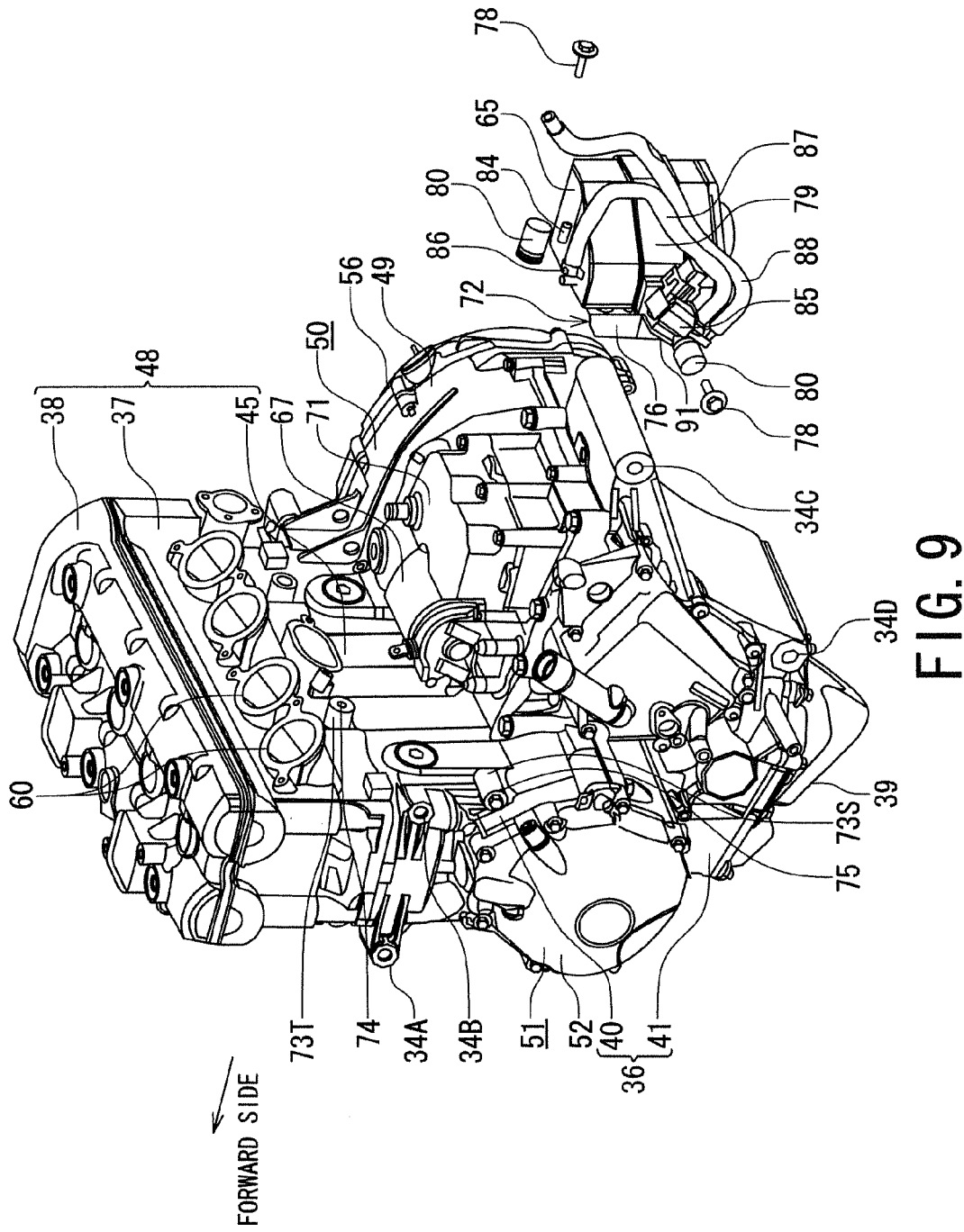
FIG. 9 is an obliquely rear perspective view showing a state where the canister in FIG. 8 is mounted to the engine.

As shown in FIGS. 8 and 9, the canister 65 is mounted to a back surface (rear surface) of the cylinder assembly 48 of the engine 14 using a fixing device 72. Specifically, a fastening boss 73T is integrally formed on a back surface of the cylinder head 37 of the cylinder assembly 48 and on a lower side of the intake port 60. A fastening boss 73S is integrally formed on a back surface of the cylinder 45 of the upper case section 40 on a lower and left side of the fastening boss 73T. The fastening boss 73T has a bolt hole 74 substantially parallel with the front/rear direction of the vehicle, and the fastening boss 73S has a bolt hole 75 parallel with the vehicle width direction.

Figure 10:
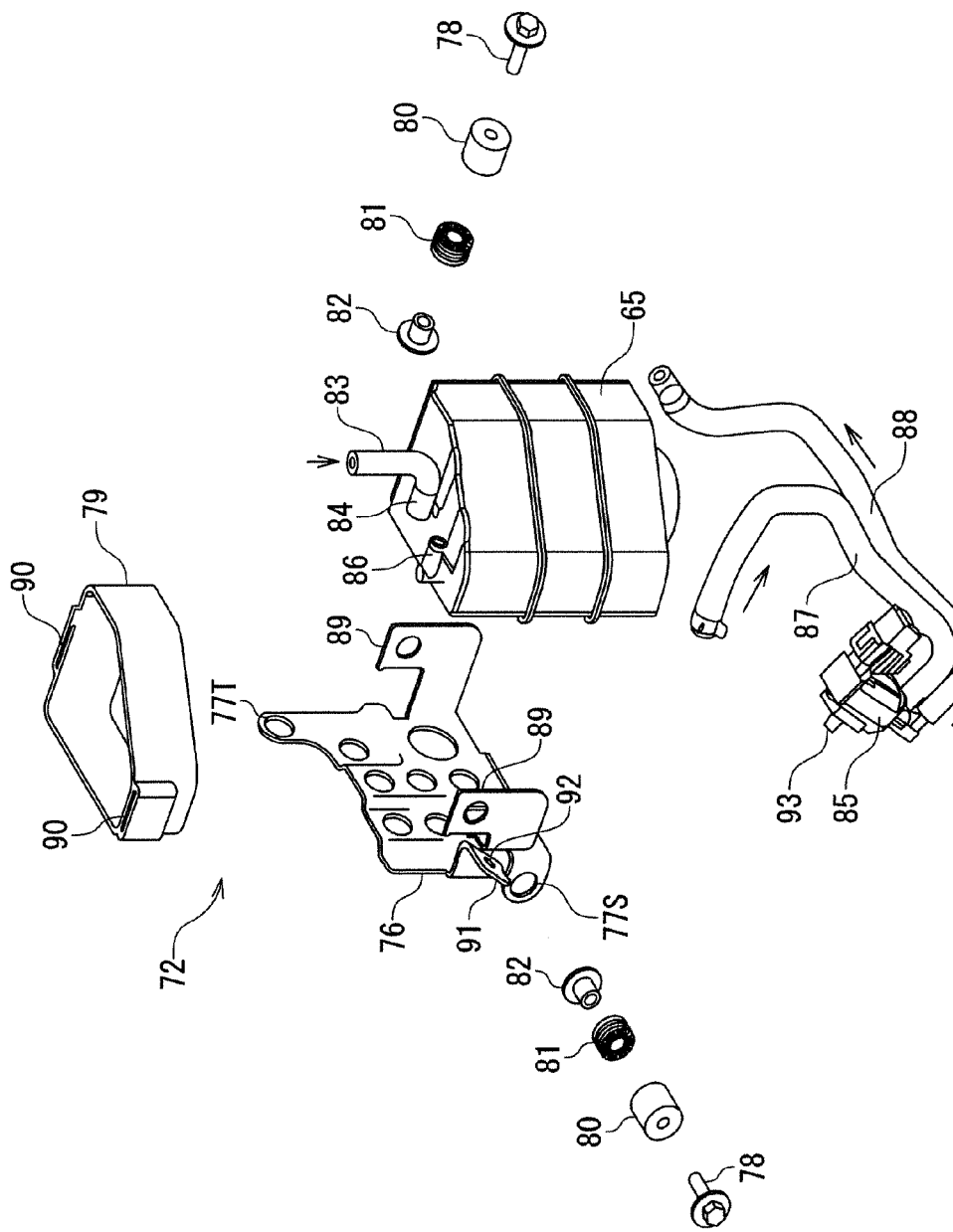
FIG. 10 is an exploded perspective view showing a fixing device for the canister in FIG. 9 together with the canister.

In the fixing device 72, a fixing fitting (fixture) 76 shown in FIG. 10 has mounting holes 77T and 77S corresponding to the fastening bosses 73T and 73S, respectively. The fastening boss 73T and the mounting hole 77T, and the fastening boss 73S and the mounting hole 77S are respectively fastened by means of mounting bolts 78, and thus, the canister 65 is fixed via the fixture 76 to the back surface of the cylinder assembly 48. At this time, it is desired that an axis of the bolt hole 74 in the fastening boss 73T and an axis of the bolt hole 75 in the fastening boss 73 cross each other.

The motorcycle 10 is a vehicle that repeats starting operation and stopping operation, is inclined in a vehicle turning operation, and is returned to an upright position after the turning. These operations may easily cause stress or vibration in the longitudinal (front/rear) direction and the lateral direction of the vehicle. Thus, as described above, the bolt holes 74 and 75 of the fastening bosses 73R and 73S cross each other in the longitudinal direction and the lateral direction, thereby providing a high holding force and a vibration preventing effect against the stress and vibration in the directions.

The fixing device 72 includes, as shown in FIG. 10, the fixing fitting 76 arranged between the cylinder assembly 48 of the engine 14 and the canister 65, a mounting band 79 that is attached to an entire periphery of a side surface of the canister 65 and holds the canister 65 on the fitting 76, and the mounting bolt 78 that fastens the fitting 76 to the cylinder assembly 48 of the engine 14 via a vibration isolating bush 80, a spacer 81 and a collar 82.

The vibration isolating bush 80 is interposed between the cylinder assembly 48 and the fixing fitting 76 to absorb vibration from the engine 14 and prevent the vibration of the engine 14 from being transmitted to the canister 65 by way of the fixing fitting 76.

The canister 65 also includes, on an upper surface, an inlet pipe 84 for introducing an evaporated fuel gas from the fuel tank 13 (FIG. 2) through a canister tube 83 and an outlet pipe 86 for guiding an evaporated fuel gas in the canister 65 to a purge valve 85. The outlet pipe 86 and the purge valve 85 are connected by a middle tube 87, and the purge valve 85 and the intake pipe 16 (FIGS. 1 and 2) are connected through an outlet tube 88.

The purge valve 85 acts to establish or interrupt communication between the canister 65 and the intake pipe 16 in accordance with operating conditions of the engine 14 and also to feed an evaporated fuel gas adsorbed by the adsorbent in the canister 65 via the intake pipe 16 to the engine 14 when the communication is established.

The evaporated fuel gas in the fuel tank 13 flows through the canister hose 83 and the inlet pipe 84 into the canister 65 and is adsorbed by the adsorbent such as activated carbon housed therein. Then, when the purge valve 85 is opened depending on the operation of the engine 14 to establish the communication between the canister 65 and the intake pipe 16, the evaporated fuel gas adsorbed by the adsorbent in the canister 65 is sucked through the purge valve 85 into the intake pipe 16 by negative pressure generated in the intake pipe 16 and is then fed to the engine 14.

The fixing fitting 76 includes a pair of left and right holding portions 89. The mounting band 79 made of resin having high elasticity is attached to the entire periphery of the side surface of the canister 65. The holding portion 89 is fitted in a fitting hole 90 provided in each of left and right portions of the mounting band 79, and the canister 65 is thus held by the fixing fitting 76. The purge valve 85 is mounted on the fixing fitting 76. Specifically, a valve mounting portion 91 is integrally formed with a side portion of the fitting 76, and a male screw portion 93 provided in the purge valve 85 is inserted into a screw hole 92 provided in the valve mounting portion 91, a nut, not shown, is screwed to the male screw portion 93 from the front side, and the purge valve 85 is thus secured to the fixing fitting 76.

In the fixing device 72 thus configured, as shown in FIGS. 9 and 10, the mounting holes 77T and 77S formed in the fixing fitting 76 are aligned with the fastening bosses 73T and 73S provided in the cylinder assembly 48 of the engine 14. The collar 82, the spacer 81 and the vibration isolating bush 80 are interposed between the fixing fitting 76 and the mounting bolt 78, and the fixing fitting 76 is secured to the back surface of the cylinder assembly 48 by means of the mounting bolt 78. According to the structure and the manner mentioned above, the canister 65 is mounted to the cylinder assembly 48 of the engine 14.

According to the embodiment of the structure described above, the present invention can attain the following advantageous functions and effects (1) to (10).

(1) The canister 65 is arranged on the rear side of the cylinder assembly 48 of the engine 14 and on the upper side of the crankcase 49 of the engine 14. Thus, the canister 65 can be arranged near the center of gravity of the vehicle, thereby improving kinetic performance of the vehicle. The canister 65 is disposed in the engine 14 arranged on the lower side of the main frame 11, thereby lowering the center of gravity of the motorcycle 10 and thus improving stability in turning the vehicle, also resulting in the improvement of the kinetic performance of the vehicle.

Furthermore, the canister is arranged inside the main frame, thereby preventing a direct impact from being applied to the canister when the motorcycle is driven to run.

(2) Since the canister 65 is disposed in the cylinder assembly 48 of the engine 14, the heat from the engine 14 is applied to the canister at the engine start time, thereby reducing a volume of the evaporated fuel gas adsorbed by the canister, and allowing an excess evaporated fuel gas to be fed to the intake pipe 16 at an early stage of the start of the engine 14. Thus, the evaporated fuel gas adsorbed by the canister 65 can be consumed at an early stage of start of the engine 14, thereby achieving the stable engine operation.

Specifically, the activated carbon as the adsorbent provided in the canister 65 has the highest adsorbing property in a cold condition to thereby decrease the increasing in the temperature. Thus, at the engine operation start period, the heat from the engine 14 is applied to the canister 65, thereby reducing an adsorbing volume of the activated carbon in the canister 65, and allowing an excess evaporated fuel gas to easily flow into the intake pipe 16.

In the structure in which the intake pipe 16 is provided with the fuel supply device, a fuel injection amount is controlled so as to obtain an appropriate ratio of fuel to a predetermined air amount. The flowing of the evaporated fuel gas from the canister 65 into the intake pipe 16 may somewhat cause an excess fuel state. Thus, it is preferred that the evaporated fuel gas accumulated in the canister 65 is consumed at as early as possible from the engine operation start. In this embodiment, the heat caused by the engine start is effectively used to change the adsorbing volume of the canister 65, and the evaporated fuel gas is fed to the intake pipe 16 and consumed at an early stage, thus achieving the stable engine operation.

(3) Since the canister 65 is disposed in the engine 14, the canister 65 can be mounted to the engine 14 using the fixing device 72 before the engine 14 is suspended from the main frame 11, thereby improving the assembling performance of the canister 65 as compared to a case where the canister 65 is mounted to the main frame 11 after the engine 14 is suspended from the main frame 11.

(4) The activated carbon provided in the canister 65 adsorbs the evaporated fuel gas, and the adsorbing property is the highest in a cold condition. Thus, the canister can adsorb maximum evaporated fuel gas during stop of the operation of the vehicle, that is, in a cold condition of the engine. Meanwhile, an evaporated gas of gasoline that is general fuel has a higher specific gravity than air. In this embodiment, the canister 65 is arranged on the lower side of the fuel tank 13, and thus during the vehicle operation stop period, that is, in a cold condition of the engine 14, the evaporated fuel gas generated in the fuel tank 13 flows down to the canister 65 without stagnation, and is adsorbed by the activated carbon in the canister 65. Thus, the evaporated fuel gas can be prevented from stagnating and leaking from the fuel tank 13 to the outside.

(5) The evaporated fuel gas adsorbed in the canister 65 flows via the purge valve 85 into the intake pipe 16 by negative pressure generated by reciprocation of the piston 44 in the cylinder at the engine start time. At this time, if the canister 65 is arranged on the upper side of the intake pipe 16, the evaporated fuel gas in the canister 65 flows down by gravity into and fills the intake pipe 16. This phenomenon may somewhat cause an excess fuel state in the motorcycle 10 including the fuel injection device such as injector, and such phenomenon is not preferable. Thus, the canister 65 is arranged on the lower side of the intake pipe 16, and therefore, the evaporated fuel gas in the canister 65 flows by gravity into the intake pipe 16 and is prevented from excessively filling the intake pipe 16, thereby stabilizing the combustion of the engine 14.

(6) The purge valve 85 is provided together with the canister 65 for the fixing device 72, thereby shortening a tube, particularly, the middle tube 87, which establishes the communication between the purge valve 85 and the canister 65, and reducing airflow resistance to the intake pipe 16. It therefore becomes possible to feed the evaporated fuel gas in the canister 65 into the intake pipe 16 even by slight negative pressure at the engine start time in the intake pipe 16.

(7) According to the structure in which the canister 65 is mounted to the engine 14, vibration of the engine 14 causes vibration of the activated carbon in the canister 65, and the activated carbon always repeats deformation in the canister 65. If such deformation occurs during traveling of the vehicle (motorcycle), an excess evaporated fuel gas may be pushed from the canister 65 into the intake pipe 16, or air may be sucked from the intake pipe 16 in a reverse manner, which may prevent satisfactory combustion of the engine 14 from causing. On the contrary, in the structure in which the canister 65 is mounted to the engine 14 using the vibration isolating bush 80 to prevent the vibration of the activated carbon as descried above, it becomes possible to operate the engine in the stable manner.

(8) Generally, the engine 14 of the motorcycle 10 has a heavier side on which the clutch chamber 50 is formed in the vehicle width direction, and because of this reason, the center of gravity of the vehicle is biased toward the clutch chamber 50 to reduce kinetic performance of the vehicle. In this embodiment, however, since the canister 65 is arranged on the side opposite to the clutch chamber 50, the center of gravity of the vehicle is formed close to the center in the vehicle width direction to thereby improve the kinetic performance of the motorcycle 10.

(9) The canister 65 uses the heat from the engine 14 to promote the consumption of the adsorbed evaporated fuel gas at an early stage. However, if the canister 65 is disposed outside the cylinder assembly 48, the canister 65 may directly receive running air to reduce the above-described advantage Taking this matter into consideration, in the present embodiment, the canister 65 is arranged within the range of the width W of the cylinder assembly 48, thereby preventing the canister 65 from directly receiving the running air, and allowing the evaporated fuel gas in the canister 65 to be consumed at an earlier stage using the heat from the engine 14.

(10) The motorcycle 10 provided with the canister device of the specific arrangement mentioned above can achieve an improved engine operation.

It is further to be noted that the present invention is not limited to the described embodiments, which can attain various advantages mentioned above, and many other changes and modifications may be made without departing from the scope of the appended claims.

What is claimed is:

1. A canister device for a motorcycle which includes a pair of left and right main frames, a fuel tank placed on an upper side of the main frames, an engine suspended on a lower side of the main frames and provided with a cylinder assembly and a crankcase, and a canister that adsorbs an evaporated fuel gas generated in the fuel tank,
wherein the canister is arranged inside the main frames in a plan view of the motorcycle and is disposed on a rear side of the cylinder assembly and on an upper side of the crankcase of the engine in a side view of the motorcycle,
wherein one end of an intake pipe is connected to an intake port formed in a cylinder head of the cylinder assembly, another end of the intake pipe is connected to an air cleaner, and the canister is disposed below the intake pipe, and
wherein the canister is mounted to the engine by a fixing member arranged between the canister and the engine, and the fixing member is mounted to the engine via a vibration isolating bush for absorbing vibration.

2. The canister device for a motorcycle according to claim 1, wherein the canister is disposed below the fuel tank.

3. The canister device for a motorcycle according to claim 1, wherein a purge valve for feeding the evaporated fuel gas adsorbed by the canister is mounted to the fixing member.

4. The canister device for a motorcycle according to claim 3, wherein the canister is arranged within a range of a width of the cylinder assembly in the vehicle width direction.

5. The canister device for a motorcycle according to claim 4, wherein a clutch chamber is provided on one side in a vehicle width direction of the crankcase of the engine, and the canister is arranged on a side opposite to the clutch chamber in the vehicle width direction.

6. The canister device for a motorcycle according to claim 5, wherein the canister is overlapped with the clutch chamber in a vehicle height direction.

* * * * *